July 9, 1929.  G. P. FINNIGAN ET AL  1,720,647
ELECTRIC SIGNALING SYSTEM
Original Filed March 27, 1915
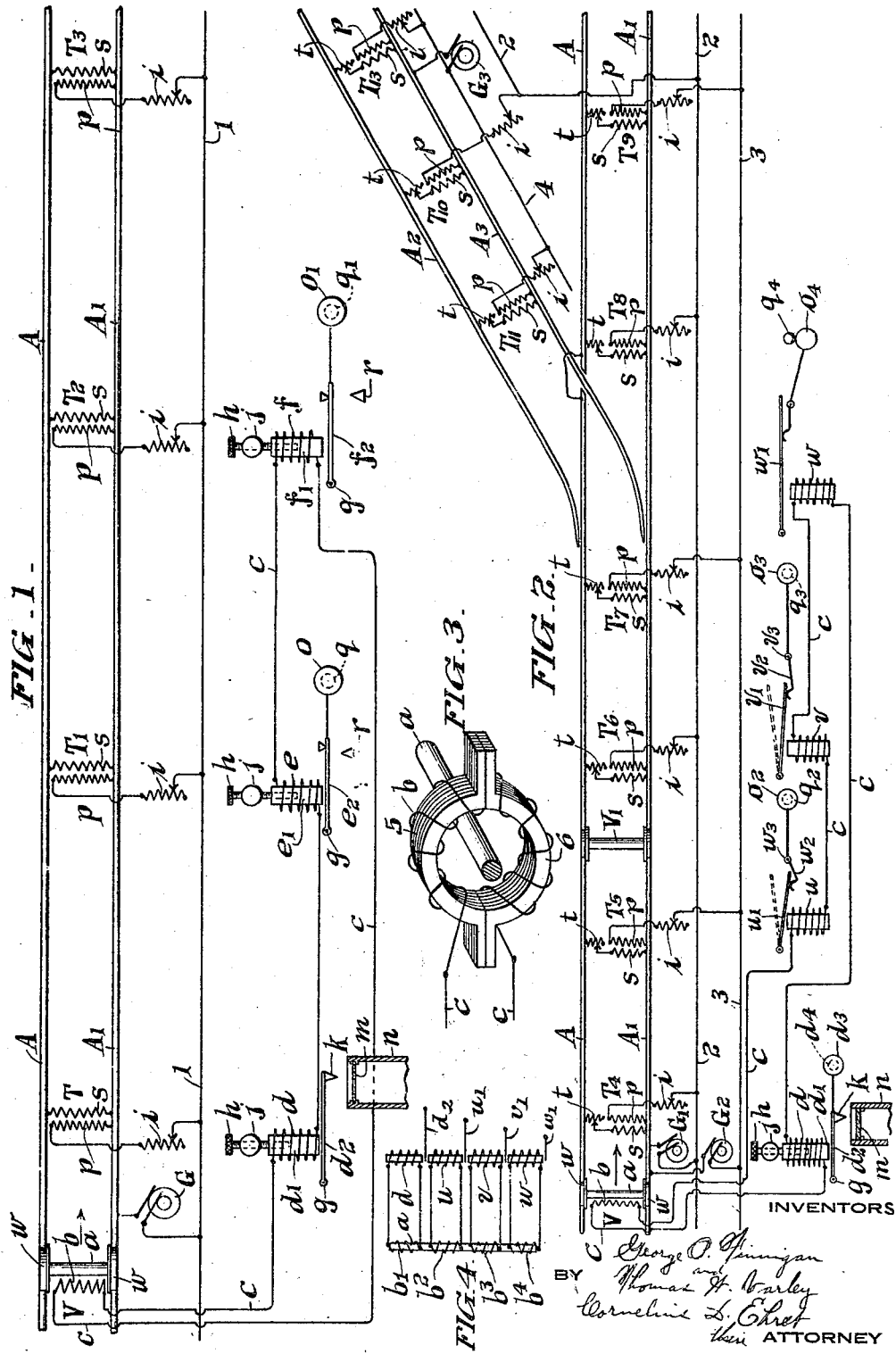

Patented July 9, 1929.

1,720,647

UNITED STATES PATENT OFFICE.

GEORGE P. FINNIGAN, OF PHILADELPHIA, PENNSYLVANIA, AND THOMAS W. VARLEY, OF NEW YORK, N. Y.; J. EARL FINNIGAN, CHARLES R. PARMELE, AND McC. GEORGE FINNIGAN, EXECUTORS OF SAID GEORGE P. FINNIGAN, DECEASED, ASSIGNORS TO GENERAL RAILWAY SIGNAL COMPANY, A CORPORATION OF NEW YORK.

ELECTRIC SIGNALING SYSTEM.

Application filed March 27, 1915, Serial No. 270,755. Renewed January 11, 1919.

Our invention relates to a system for giving indications or signals upon or controlling a moving train or vehicle in response to conditions of traffic on the path of travel of the train or vehicle.

Our invention resides in such a system in which fluctuating or alternating current is impressed upon a circuit, such as a track circuit, extending along the path of travel of the train or vehicle, the inductance or impedance of such circuit being availed of to so affect the fluctuating or alternating current that an inductively affected vehicle circuit controls train controlling means or train stop mechanism or controls signaling devices in the manner hereinafter described.

Our invention resides also in such a system in which a plurality of currents of different frequencies are impressed upon a circuit, such as a track circuit, for inductively influencing a vehicle circuit including means selectively responsive to different frequencies for giving signals or indications and for producing or for effecting vehicle control, in the manner and relation hereinafter described.

Our invention resides also in such a system employing a plurality of currents of different frequencies together with a branch vehicle track also equipped with means for inductively effecting the vehicle circuit, but in such manner as to indicate upon the vehicle its approach to or arrival at such branch track.

Our invention resides in the system and apparatus hereinafter described and claimed.

For an illustration of some of the forms our invention may take, reference is to be had in the accompanying drawing, in which:

Fig. 1 is a diagrammatic view of a system employing a current of single frequency in the track circuit.

Fig. 2 is a diagrammatic view of our system involving both main and branch tracks with means for impressing upon the track circuits fluctuating or alternating currents of different frequencies.

Fig. 3 is a perspective view of a vehicle circuit coil and its core.

Fig. 4 shows a modified arrangement of the vehicle circuits.

Referring to Fig. 1, A and $A^1$ represent rails upon which travels a vehicle or train V represented by wheels $w$, $w$ connected by the axle $a$.

The rails A and $A^1$ are preferably electrically conductively continuous.

Extending along the trackway is a conductor 1 connected to one terminal of the generator G of fluctuating or alternating current whose other terminal is connected to one of the rails, as $A^1$.

Situated at suitable intervals along the track are the transformers T, $T^1$, $T^2$, $T^3$, etc. Each transformer comprises a primary winding $p$ and a secondary winding $s$. One terminal of each primary $p$ is connected to rail $A^1$, while its other terminal is connected through the adjustable impedance $i$ to the conductor $l$. The transformers are preferably step-down transformers, that is, the voltage across the terminals of the secondary $s$ is less than the voltage impressed by the generator G upon the primary $p$. On the train or vehicle is a vehicle circuit $c$ including the winding or coil $b$ (which may be the coil $b$ of Fig. 3) and the electro-magnets $d$, $e$, $f$, having cores $d^1$, $e^1$, and $f^1$, respectively, which are iron. With these electro-magnets are associated the armatures $d^2$, $e^2$, and $f^2$, each having a pivot $g$. The screws $h$, threaded through the posts $j$ serve to adjust the cores to or away from their respective armatures.

The armature $d^2$ carries a member $k$ adapted to engage and break the frangible disk $m$, as of glass, forming a closure for the pipe $n$ connected with the train pipe of the air brake system of the train or vehicle: The armatures $e^2$ and $f^2$ carry the targets or disks $o$ normally concealing the lamps or other indicating devices $q$.

The operation is as follows:

The generator G energizes the transformers T, $T^1$, etc., thereby impressing voltages by the secondaries $s$ upon the rails A and $A^1$, similar terminals of all the secondaries $s$ being connected to the rail A and the remaining similar terminals to the rail $A^1$. With the vehicle or train in the position indicated, the transformer T delivers current flowing through the rails A, $A^1$ and through the axle $a$, the latter forming in effect a travelling conductor completing the primary circuit of a transformer whose secondary circuit is the vehicle circuit $c$. Transformer $T^1$ also delivers some current through the axle $a$, but less than the transformer $T$, because of the distance of $T^1$ from the vehicle, the intervening rails offering substantial impedance which reduces the current strength delivered by transformer $T^1$. And similarly, the other transformers $T^2$, $T^3$, etc. deliver currents of progressively smaller value through the axle $a$.

The current through the axle $a$ accordingly induces an alternating current in the closed secondary vehicle circuit $c$, thereby energizing the electro-magnets $d$, $e$ and $f$ which, with predetermined current strength through the axle $a$, hold their armatures in the attracted positions indicated. It will be understood that the armature $d^2$ will not be released until the current in the circuit $c$ falls to predetermined value. The armature $e^2$ will be released upon smaller decrease of current strength in circuit $c$, and armature $f^2$ will be released upon still smaller decrease of current strength in circuit $c$.

Assuming the vehicle V to be moving in the direction of the arrow, that is, from left toward the right, as the vehicle approaches the transformer T the current induced in the secondary circuit $c$ will increase and therefore hold all the armatures in the positions indicated. After passing the transformer T, the current delivered by it through the axle $a$ will diminish, but the current delivered through axle $a$ by the transformers $T^1$, $T^2$, $T^3$, etc. increases, so that there is maintained in the circuit $c$ for all positions of the vehicle, when the track is clear, sufficient current to keep all the armatures in the positions shown, indicating a clear track.

If, however, there is a train or vehicle on the track between the transformers $T^2$ and $T^3$, for example, when the vehicle or train V is at the position indicated, the current through the axle $a$ will be considerably diminished, in fact, to such degree that the armature $f^2$ is no longer held by the electro-magnet $f$, and the armature $f^2$ drops against the stop $r$. Accordingly the disk or target $o$ of armature $f^2$ falls with it and uncovers or displays the lamp or signal $q$. This gives to the trainman or engineer a caution signal, that is, a signal or indication that at a substantial distance ahead the track is occupied by a train or vehicle. If the vehicle V continues its progress toward the right, after it passes the transformer T and approaches the transformer $T^1$ the strength of the current through the axle $a$ from the transformer T diminishes, and since the current through the axle $a$ from transformers $T^1$, $T^2$ and $T^3$ has already been diminished below normal by the vehicle assumed on the track between transformers $T^2$ and $T^3$, the strength of the current induced in the secondary circuit $c$ will further diminish, and to such extent that the electro-magnet $e$ can no longer hold its armature $e^2$ in the attracted position indicated. Thereupon the armature $e^2$ falls, and its disk or target $o$ uncovers or reveals the signal $q$. This action indicates to the trainman or engineer that he has approached an advance vehicle or train as closely as he dare consistent with safety conditions, the uncovering of the signal $q$ by the disk $o$ of armature $e^2$ amounting to a danger indication or signal. If the vehicle V should then continue its progress towards the vehicle or train in advance, as by passing the transformer $T^1$, the current in the secondary circuit $c$ will be still further reduced and finally to such degree that the electro-magnet $d$ is no longer able to hold its armature $d^2$ attracted, whereupon the armature $d^2$ will fall and the member $k$ will fracture the glass closure $m$, allowing the train pipe of the air brake system to exhaust to atmosphere through the pipe $n$, thereby applying the brakes to the vehicle. Accordingly the vehicle is braked, either to reduce its speed or to bring it to rest, when the vehicle V approaches too closely to the vehicle in advance.

In Fig. 2 a generator $G^1$ has its one terminal connected to the electrically continuous rail $A^1$ and its other terminal to the conductor 2 extending along the track.

Disposed at suitable intervals along the track are the transformers $T^4$, $T^6$, $T^8$, etc., all preferably step-down transformers, one terminal of whose primaries $p$ is connected to either rail as $A^1$ while the other terminal is connected to the conductor 2 through the adjustable impedance $i$. Similar terminals of the secondaries $s$ are connected to the rail $A^1$ while the other terminals are connected through adjustable impedances $t$ to the rail A.

A second generator $G^2$ has its one terminal connected to the rail $A^1$ and its other terminal to the conductor 3 extending along the track.

Between the transformers $T^4$, $T^6$, $T^8$, etc., are disposed the preferably step-down transformers $T^5$, $T^7$, $T^9$, etc., whose primaries are connected to either rail as $A^1$ and through adjustable impedances $i$ to the conductor 3, while the secondaries are suitably connected across the rails $A^1$, $A^1$ through the adjustable impedances $t$.

The generators $G^1$ and $G^2$ generate alternating currents of different frequencies, the generator $G^1$ producing current of $x$ cycles per second and generator $G^2$ producing current of $y$ cycles per second.

The vehicle or train V carries thereon a vehicle circuit $c$ which includes the winding $b$, such as referred to in connection with Figs. 1 and 3, and the electro-magnets $d$, $u$, $v$ and $w$, all having iron cores. The armature $d^2$ of magnet $d$ is pivoted at $g$ and carries a member $k$ adapted to break the glass closure $m$ in the pipe $n$ connected with the train pipe of the air brake system. The armature $d^2$ may also carry the disk or target $d^3$ normally concealing the signal or lamp $d^4$. The core $d^1$ is adjustable with respect to the armature $d^2$ by the screw $h$, as described in connection with Fig. 1. The electro-magnets $u$, $v$, and $w$ have the reed armatures $u^1$, $v^1$ and $w^1$ respectively. These are indicated as having different lengths to indicate that their natural periods are different, the reed $u^1$ responding only when the electro-magnet $u$ is energized by a current of one frequency, for example, the current of frequency $x$; similarly a reed armature $v^1$ responds only to current of frequency corresponding with the frequency $y$; and the reed armature $w^1$ responds only to current of a frequency of $z$ cycles per second produced, for example, by generator $G^3$ hereinafter referred to.

In the arrangement of Fig. 2 the impedance of the rails A and $A^1$ has the effect of determining the strength of the alternating or fluctuating currents which will traverse them, the impedance having the greater effect the greater the distance of transmission of such currents through the rails.

With the track clear, currents of both frequencies $x$ and $y$ traverse the axle $a$ of the vehicle V, thereby inducing in the vehicle circuit $c$ superposed currents of both frequencies.

With the vehicle V in the position indicated in Fig. 2, the current of frequency $x$, from transformer $T^4$, will be relatively greater than the current of frequency $y$ from the more distant transformer $T^5$. However, substantial current will be induced in the circuit $c$, with the result that the electro-magnet $d$ will hold its armature $d^2$ attracted.

If the vehicle V should approach closely to the vehicle $V^1$, the current in the circuit $c$ will be so that the armature $d^2$ will fall under this danger condition and rupture glass closure $m$, with resultant application of the brakes for reducing the speed of the vehicle or bringing it to rest. Simultaneously, the indicating device, as lamp $d^4$, will be revealed, because of the dropping of the target or disk $d^3$.

With the vehicle V in the position shown, and the track clear, the currents of different frequencies induced in the circuit $c$ as above described will cause the electro-magnets $u$ and $v$ to set their reed armatures $u^1$ and $v^1$ into vibration as indicated. The reed $u^1$ responds only to current of frequency $x$, but this current is relatively large, because of proximity of vehicle V to transformer $T^4$. The reed $u^1$ being in vibration it tilts the lever $w^2$ about its pivot $w^3$ to hold the disk or target $o^2$ in front of the lamp or indicator $q^2$. And simultaneously, the reed armature $v^1$ is in vibration, though less forcibly, due to the greater distance of the transformer $T^5$ which supplies the current of frequency $y$ to which only the armature $v^1$ responds. While in vibration it holds the lever $v^2$ deflected about its pivot $v^3$ to hold the disk or target $o^3$ in front of the lamp or indicator $q^3$.

Thus when currents of both frequencies and of substantial strength are induced in the vehicle circuit $c$ the indicating lamps $q^2$ and $q^3$ are obscured, indicating a clear or safety condition of the track.

If, however, the vehicle V should approach a vehicle $V^1$, after passing the transformer $T^4$ the current of frequency $x$ would be greatly reduced in strength, though the current of frequency $y$ from transformer $T^5$ may still exist with substantial strength. Accordingly the reed $u^1$, though perhaps still vibrating, would vibrate with such slight amplitude that the target $o^2$ would rotate in a clockwise direction about the pivot $u^3$ to uncover the signal lamp $q^2$, thus giving a caution signal. The continued vibration of the reed $v^1$ at substantially greater amplitude would keep the lamp $q^3$ covered or substantially so.

If, however, the vehicle V should approach the vehicle $V^1$ still more closely, the current of frequency $y$ from transformer $T^5$ would be still further reduced, and to such extent that the amplitude of vibration of reed $v^1$ would decrease to such extent that the target $o^3$ would rotate in a clockwise direction about its pivot $v^3$ to reveal the signal or lamp $q^3$. With both lamps $q^2$ and $q^3$ displayed there would be a danger indication. If, then, the vehicle V approached still closer to the vecle $V^1$ the secondary currents in circuits $c$ would be so far reduced that the armature $d^2$ would be released with the results above described.

Since the transformers delivering currents of different frequencies alternate with each other, at one time the reed $u^1$ will because of its diminished amplitude of vibration produce a caution signal by displaying one lamp; and in another case the reduction of amplitude of vibration of $V^1$ will give the caution signal, depending upon the position of the vehicle V with respect to the transformers. But in all cases when both lamps $q^2$ and $q^3$ are displayed a danger indication is given.

In the examples above assumed the reed $w^1$ does not respond because there is not induced in the secondary circuit $c$ a current corresponding with the track circuit current of frequency $z$, and accordingly the lamp or incator $q^4$ remains displayed by the disk $o^4$.

Should the rails $A^2$ and $A^3$ of the branch track be thrown by a track switch into position to divert the vehicle V on to the branch track, there will be further induced upon the track circuit including rails A and $A^1$ a current of frequency $z$ produced by generator $G^3$ whose one terminal connects with the rail $A^3$ and thus with the rail $A^1$, and whose other terminal is connected to the conductor 4 extending along the branch track. Near the beginning of the branch track a transformer $T^{11}$ has its secondary $s$ connected across the rails $A^2$ and $A^3$ and therefore across the rails $A$, $A^1$, the primary $p$ being connected through adjustable impedance $i$ with the conductor 4. There is accordingly impressed upon the track circuit including rails $A$, $A^1$ a current of frequency $z$ resulting, when the vehicle $V$ approaches the track switch in the induction of a current of frequency $z$ in the vehicle circuit $c$, causing the reed $w^1$ to vibrate first with small amplitude and then at greater and greater amplitude, with the result that the lamp $q^4$ is concealed by the target $o^4$. The concealment of the lamp $q^4$ indicates to the driver of the vehicle $V$ that he is approaching the track switch. If it is intended that the vehicle $V$ shall continue on the track comprising rails $A$, $A^1$ he will accordingly bring his vehicle to rest before reaching the track switch.

If it is intended that the vehicle $V$ shall pass on to the branch track comprising rails $A^2$ and $A^3$, the vehicle $V$ would pass through the track switch and thereafter proceed along the branch track, provided with the transformers $T^{11}$, $T^{13}$, etc. supplied from generator $G^3$ while between each pair of such transformers will be placed transformers $T^{10}$, etc. having their primaries connected to the conductor 2 and therefore delivering to the rails $A^2$, $A^3$ current of frequency $x$.

Therefore, after switching to the branch track the reeds $u^1$ and $w^1$ will cooperate to give caution or danger signals as described in connection with the passage of the vehicle over the rails $A$ and $A^1$. Reed $v^1$ will be inactive because while on the branch track the circuit $c$ does not have induced therein substantial current of frequency $y$.

As regards the branch track, it will be noted that one current impressed thereon is of a frequency similar to the frequency of one of the currents impressed upon the main track; and that in addition to this current of common frequency there is impressed upon the branch track a current of frequency different from both of those impressed upon the main track; and that while on the branch track a different pair of devices in the vehicle circuit selectively respond to the currents induced therein.

In Fig. 3 the coil $b$ of the vehicle circuit is disposed upon the laminated core members 5 and 6 which are carried by the vehicle and placed together to form a closed magnetic circuit around the axle $a$ which extends through the core 5, 6, the axle $a$ being part of a primary circuit of a transformer whose core is 5, 6 and whose secondary coil or winding is $b$.

It will be understood that this arrangement of Fig. 3 may be used in the arrangements described in connection with Figs. 1 and 2.

While in Figs. 1 and 2 there is but one vehicle circuit with all the electro-magnets connected therein, it will be understood that each electro-magnet may be in an independent vehicle circuit having its independent coil inductively influenced by the current passed from the rails through the conductor $a$ upon the vehicle. This is illustrated in Fig. 4 where the coils $b^1$, $b^2$, $b^3$ and $b^4$ represent the coils which are inductively influenced by the current passing through the vehicle conductor $a$; and in circuit with each of these coils is connected one of the electro-magnets $d$, $u$, $v$ and $w$ for controlling respectively reeds or other devices $d^2$, $u^1$, $v^1$ and $w^1$ as described in connection with Fig. 2. And it will be understood that Fig. 1 may be similarly modified.

This application is a continuation in part of our application Serial Number 612,197, filed March 4, 1911.

What we claim is:

1. The combination with conductively continuous track rails, of a vehicle movable thereon, a source of fluctuating current, one terminal of said source connected to one of said rails, a conductor connected to another terminal of said source, a transformer primary having one terminal connected to said conductor and another terminal connected to said one of said rails, the transformer secondary having its terminals connected to said track rails respectively, a conductor on said vehicle for contacting with said rails to complete the secondary circuit of said transformer, a vehicle circuit in inductive relation with said vehicle conductor, and a translating device controlled by said vehicle circuit.

2. The combination with conductively continuous track rails, of a vehicle movable thereon, a conductor, means for impressing fluctuating current upon a circuit including said conductor and one of said track rails, a plurality of transformer primaries disposed at intervals along said track rails and connected to said one of said rails and said conductor, transformer secondaries connected across said track rails, a conductor movable with said vehicle for contacting with said rails to complete the secondary circuits of said transformers, a vehicle circuit in inductive relation with said conductor on said vehicle, and a translating device controlled by said vehicle circuit.

3. The combination with conductively continuous track rails, of a vehicle movable thereon, a source of fluctuating current, one terminal of said source connected to one of said rails, a conductor connected to another terminal of said source, a transformer primary having one terminal connected to said conductor and another terminal connected to said one of said rails, the transformer secondary having its terminals connected to said track rails respectively, a conductor on said vehicle for contacting with said rails to complete the secondary circuit of said transformer, a vehicle circuit in inductive relation with said vehicle conductor, and a translating device in said vehicle circuit, said translating device being selectively responsive to the frequency of the current induced in said vehicle circuit.

4. The combination with conductively continuous track rails, of a vehicle movable thereon, a conductor, means for impressing fluctuating current upon a circuit including said conductor and one of said track rails, a plurality of transformer primaries disposed at intervals along said track rails and connected to said one of said rails and said conductor, transformer secondaries connected across said track rails, a conductor movable with said vehicle for contacting with said rails to complete the secondary circuits of said transformers, a vehicle circuit in inductive relation with said conductor on said vehicle, and a translating device controlled by said vehicle circuit, said translating device being selectively responsive to the frequency of the current induced in said vehicle circuit.

5. The combination with a vehicle, of a conductor extending along the path of travel of said vehicle, means for impressing fluctuating current on said conductor, a vehicle circuit inductively affected by said current, and a plurality of translating devices controlled respectively by different current strengths in said vehicle circuit.

6. The combination with a moving vehicle, of a circuit thereon, means disposed in the path of travel of said vehicle for normally continuously inducing a current in said circuit, change in position of said vehicle on its path of travel gradually changing the strength of said induced current, vehicle speed controlling means, a magnet normally energized by the current in said vehicle circuit, an armature, said magnet releasing said armature upon predetermined decrease in strength of current in said vehicle circuit for controlling said speed controlling means.

7. The combination with a moving vehicle, of a circuit thereon, means disposed in the path of travel of said vehicle for normally continuously inducing a current in said circuit, change in position of said vehicle on its path of travel gradually changing the strength of said induced current, vehicle brake controlling means, a magnet normally energized by the current in said vehicle circuit, an armature, said magnet releasing said armature upon predetermined decrease in strength of current in said vehicle circuit for controlling said brake controlling means.

8. The combination with a moving vehicle, of a circuit thereon, means disposed in the path of travel of said vehicle for normally continuously inducing current in said vehicle circuit, change in position of said vehicle on its path of travel gradually changing the strength of said induced current, an electro-magnet in said vehicle circuit, an armature therefor, said magnet normally holding said armature attracted and releasing the same upon predetermined decrease in strength of current in said vehicle circuit, and a signal controlled by said armature.

9. The combination with a moving vehicle, of a circuit thereon, means disposed in the path of travel of said vehicle for normally continuously inducing current in said vehicle circuit, change in position of said vehicle on its path of travel gradually changing the strength of said induced current, an electro-magnet in said vehicle circuit, an armature therefor, said magnet normally holding said armature attracted and releasing the same upon predetermined decrease in strength of current in said vehicle circuit, a signal, and means carried by said armature normally concealing said signal.

10. The combination with conductively continuous track rails, of sources of currents of different frequencies, a terminal of each of said sources connected to one of said rails, conductors connected to the other terminals of said sources, a plurality of transformers spaced along said track rails and having their primaries connected to one of said conductors and to said one of said track rails, transformers spaced between said first named transformers and having their primaries connected to another of said conductors and to said one of said track rails, the secondaries of all of said transformers connected across said track rails, a vehicle circuit inductively affected by the currents of different frequencies impressed upon said track rails, and translating devices selectively responsive respectively to the currents of different frequencies induced in said vehicle circuit.

11. The combination with conductively continuous track rails, of sources of currents of different frequencies, a terminal of each of said sources connected to one of said rails, conductors connected to the other terminals of said sources, a plurality of transformers spaced along said track rails and having their primaries connected to one of said conductors and to said one of said track rails, transformers spaced between said first named transformers and having their primaries connected to another of said conductors and to said one of said track rails, the secondaries of all of said transformers connected across said track rails, a vehicle circuit inductively affected by the currents of different frequencies impressed upon said track rails, translating devices selectively responsive respectively to the currents of different frequencies induced in said vehicle circuit, an electro-magnet in said vehicle circuit normally energized by current of any or all frequencies in said vehicle circuit, and vehicle speed controlling means, said electro-magnet releasing its armature upon predetermined decrease in strength of current in said vehicle circuit to control said vehicle speed controlling means.

12. The combination with a moving vehicle, of a circuit thereon, a conductor on said vehicle in inductive relation to said circuit, means disposed along the path of travel of said vehicle for passing fluctuating current through said conductor, the strength of the current passed through said conductor depending upon the position of said vehicle, a gradual change in position of said vehicle on its path of travel, gradually changing the strength of said current and a translating device selectively responsive to current of the frequency induced in said vehicle circuit, the degree of response depending upon the strength of said current induced in said vehicle circuit.

13. The combination with a moving vehicle, of a circuit thereon, a conductor movable with said vehicle and disposed in inductive relation with said circuit, means disposed along the path of travel of said vehicle for passing through said conductor current fluctuating at predetermined rate, a gradual change in position of said vehicle on its path of travel, gradually changing the strength of said current, a translating device in said vehicle circuit selectively responsive to the frequency of the current induced in said vehicle circuit, and means in said vehicle circuit for displaying a signal upon substantial weakening of said current induced in said vehicle circuit.

14. The combination with main track rails, of branch track rails adapted to communicate therewith, a vehicle movable over said rails, means for impressing upon the main track rails a current of predetermined frequency, means for impressing upon the rails of the branch track a current of different frequency, a vehicle circuit inductively influenced by said currents, and a plurality of translating devices controlled by said vehicle circuit and selectively responsive respectively to the currents of different frequencies induced in said vehicle circuit.

15. The combination with main track rails, of branch track rails, means for impressing upon said main track rails currents of different frequencies, means for impressing upon said branch track rails currents of different frequencies, a current impressed on the branch track rails differing in frequency from current impressed upon said main track rails, a vehicle circuit inductively influenced by all said currents, and a plurality of translating devices controlled by said vehicle circuit and selectively responsive respectively to currents of different frequencies induced in said vehicle circuit.

16. The combination with main track rails, of branch track rails, means for impressing upon said main track rails currents of different frequencies, means for impressing upon said branch track rails currents of different frequencies, a current impressed on the branch track rails different in frequency from current impressed upon said main track rails, a vehicle circuit inductively influenced by all said currents, and a plurality of translating devices controlled by said vehicle circuit and selectively responsive respectively to currents of different frequencies induced in said vehicle circuit, the frequency of one of said currents impressed upon said main track rails being the same as the frequency of one of said currents impressed upon said branch track rails.

17. The combination with a main track, of a branch track, a vehicle, a plurality of translating devices on said vehicle selectively responsive respectively to currents of different frequencies, sources of currents of different frequencies associated with said main and branch tracks respectively, and means inductively associating said translating devices with said sources.

18. A stretch of railway track, a plurality of sources of current differing in frequency connected to the track rails in rotation, a vehicle, a plurality of electro-magnetic devices on said vehicle one for each frequency of current, responsive only to current in the track rails of the corresponding frequency, and governing apparatus on said vehicle responsive to the number of electromagnetic devices energized at a time.

19. In an automatic train control system of the continuous inductive type, the combination with a railway track, a railway vehicle traveling on said track, means for causing alternating current to flow ahead of the vehicle down one track rail through the axles of the vehicle and back through the other rail, means on the vehicle for inductively by transformer action detecting the flow of said alternating current and maintaining two electro-responsive devices energized so long as such alternating current is flowing in the track rails, an air brake system on the vehicle having a normally charged brake pipe which if vented causes the vehicle brakes to be applied, means for venting said brake pipe upon de-energization of one of said electro-responsive devices and means for displaying a visual cab signal upon de-energization of said other electro-responsive device.

20. In an automatic train control system of the continuous inductive type, the combination with a railway track, a railway vehicle traveling on said track, means for causing alternating current to flow ahead of the vehicle down one track rail through the axles of the vehicle and back through the other rail, means on the vehicle for inductively by transformer action detecting the flow of said alternating current and maintaining electro-responsive means energized so long as such alternating current is flowing in the track rails, an air brake system on said vehicle of the type including a normally charged brake pipe which if vented effects an application of the brakes of the vehicle, signaling means on the vehicle, and means for venting said brake pipe and rendering said signaling means active upon de-energization of said electro-responsive means.

21. In an automatic train control system of the continuous inductive type, the combination with a main track and a branch track, means for causing the flow of alternating current of a particular character in the rails of the main track, means for causing the flow of alternating current distinctive from the first mentioned alternating current in the track rails of the branch track, a railway vehicle, electro-responsive brake control means on the vehicle tending to assume an active condition maintained inactive if either of said alternating currents is flowing in the track rails ahead of the vehicle, and signaling means on the vehicle distinctively indicating whether one or the other of said alternating currents is flowing in the track rails ahead of the vehicle.

22. In an automatic train control system of the continuous inductive type, the combination with a railway track and a vehicle thereon, receiving means on the vehicle for inductively by transformer action distinctively detecting the flow of currents of different and distinctive characters flowing in the track rails ahead of the vehicle, signal means on the vehicle for giving distinctive indications depending on the character of current flowing in the track rails and detected by said receiving means, brake control means on the vehicle maintained inactive if any one of several distinctive currents is flowing in the track rails and detected by said receiving means, and means for causing the flow of distinctive alternating currents in the trackway depending on traffic conditions ahead.

23. In an automatic train control system of the continuous inductive type, the combination with a railway track and a vehicle thereon, receiving means on the vehicle for inductively by transformer action distinctively detecting the flow of currents of different and distinctive characters flowing in the track rails ahead of the vehicle, signal means on the vehicle for giving distinctive indications depending on the character of current flowing in the track rails and detected by said receiving means, air brake equipment on the vehicle of the type including a normally charged brake pipe which if vented causes the brakes to be applied, normally energized electro-responsive means which if de-energized effects venting of said brake pipe and maintained energized if any one of several distinctive currents is flowing in the track rails and is detected by said receiving means, and means for causing the flow of distinctive alternating currents depending on traffic conditions ahead.

24. In an automatic train control system of the continuous inductive type, the combination with a trackway having two kinds of territory, a vehicle for movement on said trackway, receiving means on the vehicle for inductively by transformer action distinctively detecting the flow of alternating current of different and distinctive characters in the track rails ahead of the vehicle, means for causing the flow of distinctive alternating currents in the track rails ahead of the vehicle in said two territories under clear traffic conditions ahead of such vehicle in a manner so that such current is shunted away by another vehicle ahead, signal means on the vehicle for giving distinctive indications in accordance with the character of current detected by said receiving means informing the engineer whether he is traveling in one or the other of said territories, and brake control means maintained inactive so long as said receiving means is detecting alternating current of the proper character.

In testimony whereof we have hereunto affixed our signatures this 26th day of March, 1915.

GEORGE P. FINNIGAN.
THOMAS W. VARLEY.